Patented Aug. 13, 1940

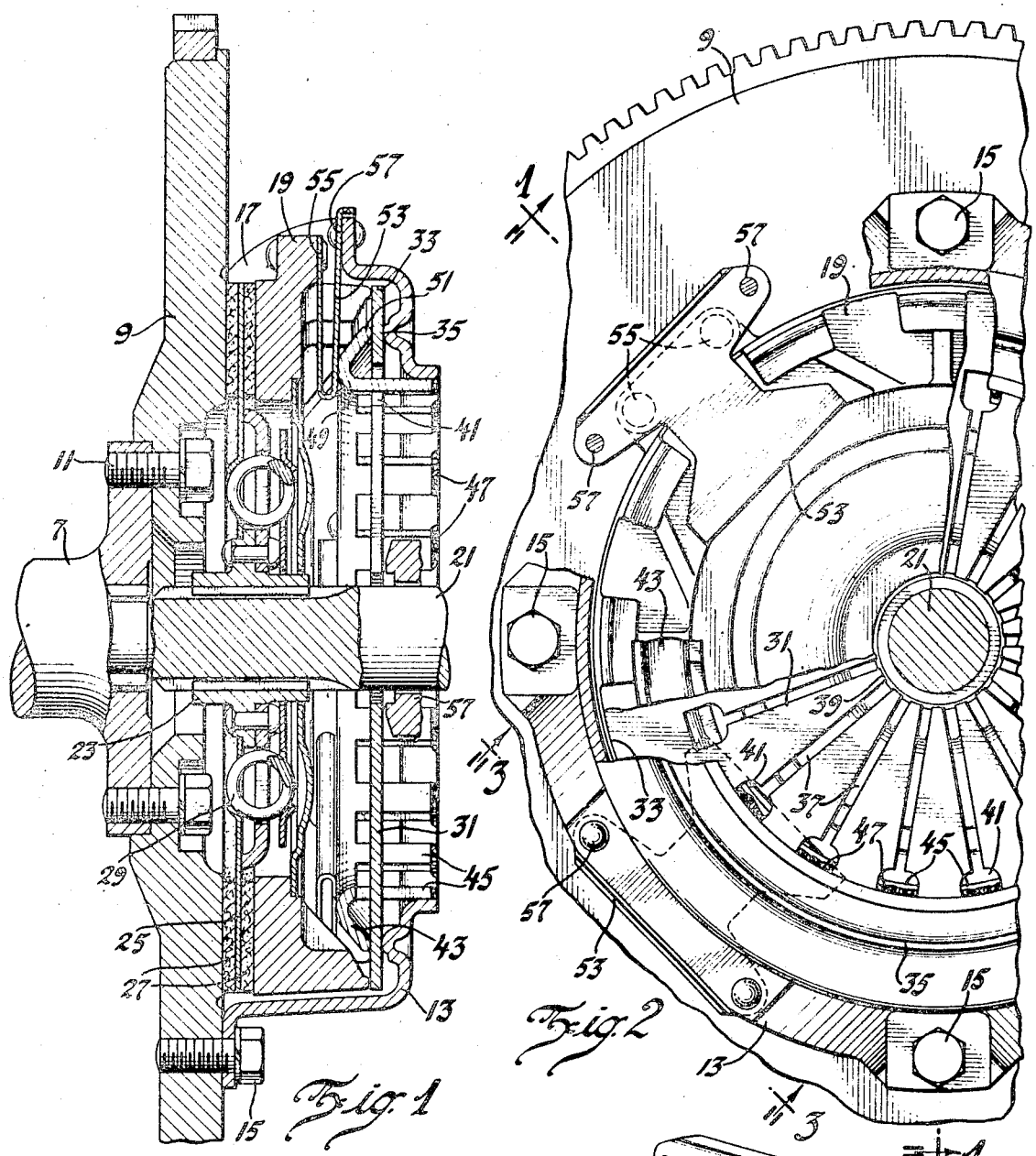
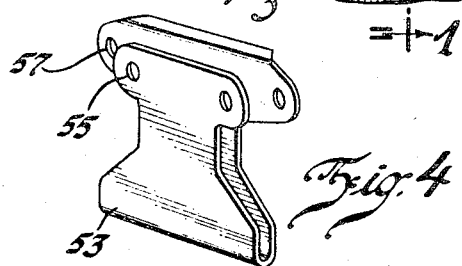
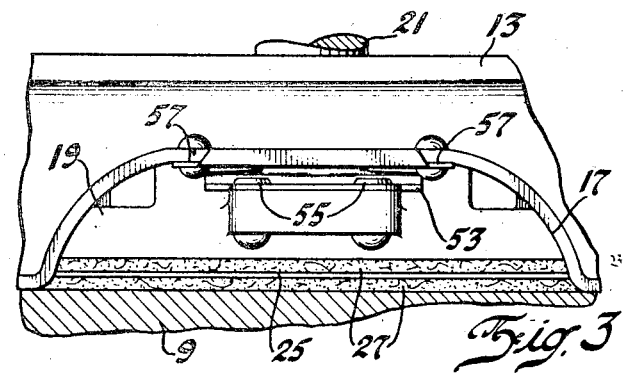

2,211,192

UNITED STATES PATENT OFFICE 2,211,192

FRICTION CLUTCH

William S. Wolfram, Dayton, Ohio, assignor to General Motors Corporation, Detroit, Mich., a corporation of Delaware Application February 27, 1939, Serial No. 258,645

2 Claims. (Cl. 192—68)

This invention relates to friction clutches and has been made as the result of an effort to improve the friction clutch through the instrumentality of which the engine of the motor vehicle drives the transmission input shaft.

In clutches of the kind referred to there is usually provided a cover fixedly secured to but having an abutment portion spaced from the flywheel on the engine shaft. Adapted to be gripped between the face of the flywheel and an axially movable pressure plate is the driven plate. A suitable spring in abutment with the cover plate biases the pressure plate to its active position. Means is also provided to release the pressure plate from the action of the spring and usually yieldable means is also provided to reciprocate the pressure plate away from the flywheel when the clutch is to be released. The present invention is of this kind and it includes an improvement in the mounting of the clutch engaging spring and in the parts associated therewith. It also includes improvements in the mechanism by which the pressure plate is centered relative to and is made to rotate with the flywheel and by which the pressure plate is moved away from the flywheel when the clutch is disengaged.

The main object of the invention is to improve and simplify a clutch in the above particulars and by the use of structure which shall be highly efficient, comparatively inexpensive and easy to assemble.

Other objects will be understood from the following description.

In the drawing:

Figure 1 is a transverse section through a clutch embodying my invention taken on line 1—1 of Figure 2.

Figure 2 is a view in elevation with parts broken away and in section.

Figure 3 is a section as seen from line 3—3 of Figure 2.

Figure 4 is a detail in perspective.

Numeral 7 represents the engine shaft and 9 the flywheel secured thereto as at 11. To the flywheel is attached a cover 13 by circumferentially spaced fastening means 15, the cover being shaped as shown by Figure 1 to provide openings 17 between the adjacent fastening means.

Within the cover is a pressure plate 19. Projecting into the closure formed by the cover is a driven shaft 21. It carries a hub 23 mounted to rotate with shaft 21. A driven plate 25 with facings 27 is associated with the hub, there being shown coil spring 29 by which torque is transmitted between the driven plate and the hub when the driven plate is gripped between the flywheel and pressure plate. No novelty is herein claimed for the structural details of these cushioning torque transmitting springs and further description of their mounting need not be given.

In accordance with the invention the spring by which the pressure plate is moved to grip the driven plate is of the Belleville washer type. The drawing shows it in the form of a coned disc 31. Along its circular outer edge 33 the spring engages the pressure plate. Radially inward from its line contact at 33 it is in abutment with a circular bulged formation 35 on the cover. The annulus between the circles at 33 and 35 is unbroken and the spring, in being assembled, is so prestressed from its more conical unloaded form as to exert axial pressure on the pressure plate, the cover serving as the abutment. Slots 37 extend from the circular inner margin 39 of the spring to apertures 41 so shaped as to minimize splitting of the material adjacent the periphery.

In prior practice such a spring has been supported by a plurality of pins carried by the cover and extending through the equivalent of openings 41. Rings have been supported on these pins to serve as circular contact members or fulcra for the spring. My present arrangement is of much simpler form. I use an annular member 43. This member has axially extending fingers 45 which pass through apertures 41 and the ends of these fingers are welded to the cover at 47. Within the cover and spring 31 the annulus 43 is bent to form an acute angle at 49 and is shaped at its margin to form a rounded spring abutment 51. This abutment 51 lies closely adjacent to but is spaced from the abutment 35 sufficiently to accommodate the spring as shown in Figure 1. This inexpensive single part 43 thus centers the spring and serves as a fulcrum bearing taking the place of the pins and rings heretofore used.

The invention also makes use of novel and inexpensive means whereby the pressure plate is centered and made to rotate with the flywheel without the provision of notches and driving lugs. A plurality of metal springs 53 are bent from flat spring steel into U-shape as shown by Figure 4. The sides at their ends are secured at 55 and 57 to the pressure plate and cover. Through the instrumentality of these springs of which there may be four, distributed symmetrically, the rotation of the cover is transmitted to the pressure plate. Also when the main spring 31 pushes the pressure plate to clutch engaging position, each spring 53 is stressed. When the clutch is released these springs 53 insure axial reciprocation of the pressure plate to full releasing position. The springs 53 therefore serve to transmit the drive from the flywheel to the pressure plate, to insure the releasing movement of the pressure plate, and they serve to center the pressure plate in the assembly.

The action of the Belleville spring in effecting the clutch engagement will be appreciated without further description. To release the clutch, pressure is applied by any convenient form of clutch releasing lever, not shown, to the ring 57. This pressure takes the load of the spring from the line contact at 35. The spring then moves about 51 as a fulcrum and the spring load is removed from the pressure plate. Spring 53 which was put in tension by the action of the main spring in effecting clutch engagement now serves to withdraw the pressure plate away from the flywheel.

I claim:

1. In a clutch, a flywheel, a cover having a central opening, a pressure plate within said cover, a driven plate adapted to be gripped between said flywheel and pressure plate, a conical spring in peripheral engagement with said pressure plate and having a circular line contact with said cover, an annular member having parts extending axially within the cover opening and secured to said cover and having a circular fulcrum line adjacent to but spaced axially from said cover contact line, and means to relieve the pressure of said spring from said first line contact and to use said second line contact as a fulcrum to effect clutch release.

2. In a clutch, a flywheel, a cover having regions spaced axially from the flywheel, a pressure plate within said cover, a driven plate adapted to be gripped between said flywheel and pressure plate, main spring means engaging said pressure plate and in abutment with said cover, U-shaped flat springs having legs attached to the pressure plate and cover, the attachment to the cover being to the said spaced regions thereof, said flat spring centering the pressure plate transmitting torque thereto, and serving to move the pressure plate to its clutch releasing position.

WILLIAM S. WOLFRAM.